United States Patent
Moore (10) Patent No.: US 10,932,616 B2
(45) Date of Patent: Mar. 2, 2021

(54) DRINKING/FEEDING CONTAINER WITH A THERMOELECTRIC DEVICE TO HEAT A FLOW OF FLUID

(71) Applicant: Christopher T. Moore, Hershey, PA (US)

(72) Inventor: Christopher T. Moore, Hershey, PA (US)

( * ) Notice: Subject to any disclaimer, the term of this patent is extended or adjusted under 35 U.S.C. 154(b) by 445 days.

(21) Appl. No.: 15/907,871

(22) Filed: Feb. 28, 2018

(65) Prior Publication Data
US 2018/0255966 A1    Sep. 13, 2018

Related U.S. Application Data

(60) Provisional application No. 62/467,921, filed on Mar. 7, 2017.

(51) Int. Cl.
*A47J 36/24* (2006.01)
*A61J 9/00* (2006.01)

(52) U.S. Cl.
CPC ....... *A47J 36/2433* (2013.01); *A47J 36/2461* (2013.01); *A47J 36/2444* (2013.01); *A61J 9/001* (2013.01); *A61J 2200/42* (2013.01)

(58) Field of Classification Search
CPC ................ A47J 36/2433; A47J 36/2461; A47J 36/2444; A47J 36/2483; A47J 36/24; A61J 9/02; A61J 9/001; A61J 2200/42; A61J 9/0615; A61J 11/002; A61J 9/00; A47G 19/2288
See application file for complete search history.

(56) References Cited

U.S. PATENT DOCUMENTS

| | | | |
|---|---|---|---|
| 3,931,494 A | 1/1976 | Fisher et al. | |
| 3,998,348 A * | 12/1976 | Sammaritano | A61J 9/001 215/11.3 |
| 4,095,090 A | 6/1978 | Pianezza | |
| 4,782,670 A * | 11/1988 | Long | A47G 19/2288 165/80.5 |
| 4,801,782 A | 1/1989 | Ineson | |
| 5,208,896 A | 5/1993 | Katayev | |

(Continued)

FOREIGN PATENT DOCUMENTS

| | | |
|---|---|---|
| CN | 1064208 A | 9/1992 |
| WO | 2004/054414 A1 | 7/2004 |

*Primary Examiner* — David J Walczak
(74) *Attorney, Agent, or Firm* — Carter, DeLuca & Farrell LLP; George Likourezos (57) ABSTRACT

A drinking/feeding container and method for delivering fluid to a user at a drinking/feeding temperature which is higher than a storage temperature of the fluid. The container includes a fluid storage compartment, a lid and a heating device. The heating device is positioned between the fluid storage compartment and the lid. The heating device has an inlet which accepts the fluid from the fluid storage compartment, an outlet which dispenses the fluid to the lid and a passageway which extends between the inlet and the outlet. A Peltier device is provided between the inlet and the outlet and cooperates with the passageway to heat the fluid as the fluid moves from the inlet to the outlet. A power source supplies power to the heating device. A pulsing member pulses the power to the heating device whereby the pulsing of the power prevents the heating element from overheating.

17 Claims, 4 Drawing Sheets

(56) References Cited

U.S. PATENT DOCUMENTS

| | | | |
|---|---|---|---|
| 5,397,031 A | 3/1995 | Jensen | |
| 6,072,161 A | 6/2000 | Stein | |
| 6,310,329 B1 | 10/2001 | Carter | |
| 6,314,867 B1 | 11/2001 | Russell | |
| 6,639,186 B1 | 10/2003 | Perez | |
| 6,864,462 B2 * | 3/2005 | Sanoner | A47G 19/2227 |
| | | | 219/387 |
| 6,870,135 B2 | 3/2005 | Hamm et al. | |
| 7,022,946 B2 | 4/2006 | Sanoner et al. | |
| 7,431,613 B1 | 10/2008 | Liu et al. | |
| 7,451,691 B2 * | 11/2008 | Robertson | A21B 3/04 |
| | | | 219/401 |
| 8,558,145 B2 | 10/2013 | Lin et al. | |
| 9,029,738 B2 | 5/2015 | Redl | |
| 9,035,222 B2 | 5/2015 | Alexander | |
| 9,848,720 B2 * | 12/2017 | Yekutiely | G06Q 50/12 |
| 2006/0081599 A1 * | 4/2006 | Anderson | A47J 36/2433 |
| | | | 219/438 |
| 2008/0179311 A1 | 7/2008 | Koro et al. | |

* cited by examiner

DRINKING/FEEDING CONTAINER WITH A THERMOELECTRIC DEVICE TO HEAT A FLOW OF FLUID

FIELD OF THE INVENTION

The present invention relates to a drinking/feeding container suitable for use with, but not exclusively, a travel mug/container or an infant's feeding bottle, for heating a flow of fluid at storage temperature, passing through the device, to a temperature acceptable for drinking by a user.

BACKGROUND OF THE INVENTION

The methods presently used for heating pre-prepared liquid drinks or feeds for an infant, such as heating in a microwave, standing in a pan of boiling water or conventional baby bottle warmer, have a number of disadvantages: the need for an external heat and power source is often an inconvenience, for example when the baby requires feeding away from home; overheating the liquid can occur, requiring the liquid to be cooled or discarded; the temperature of the liquid will reduce as the baby feeds, possibly dropping below the temperature the infant finds acceptable for feeding; heating the liquid takes time, if the baby is hungry this can lead to the baby becoming stressed.

These methods of heating have a further disadvantage in that they require heating the entire volume of liquid that has been pre-prepared; as the quantity of liquid the baby is likely to drink is unpredictable and some liquids, such as milk, particularly breast milk, are not suitable for repeated reheating, unfinished liquid may need to be discarded.

SUMMARY OF THE INVENTION

An object of the present invention is to avoid or minimize one or more of the above disadvantages.

An object of the present invention is to provide a safe, removable heating device, adapted for use with a drinking/feeding container, for example, a travel mug or an infant's feeding bottle.

An object of the present invention is to provide a non-return mechanism for preventing fluid that has passed through inlet means of the heating device from returning to a storage compartment of the drinking/feeding container.

An object of the present invention is to provide a drinking/feeding container for an infant, to provide the infant with a fluid or liquid feed at an acceptable consumption temperature.

An object of the present invention is to provide a drinking/feeding container for a child or adult, to provide the child or adult with a fluid or liquid feed at an appropriate and acceptable consumption temperature.

An object of the present invention is to provide a drinking/feeding container in which the fluid or liquid feed is drawn from the fluid storage container, through the heating device where the temperature of the fluid is elevated from the storage temperature in the fluid storage compartment to an acceptable drinking/feeding temperature for the user.

The heating device may be attached to the fluid storage container by a threaded connection; alternatively, it may be a push fit or other suitable connection.

The drinking/feeding container may be a re-usable container or, alternatively, it may be some form of disposable bottle or a carton with (or without) pre-packaged fluid.

A lid attached to the heating device may be a mouthpiece, such as a nipple, spout or straw.

The lid may be a gel filled nipple with heat conducting gel to maintain the temperature of the fluid. The nipple itself will be a comfortable warm temperature for the baby just like mother's breast.

The heating device may be a Peltier device. In one embodiment, the Peltier device is disk shaped with the outlet in the middle of the disk. The Peltier device is configured to keep the fluid in the storage container at or below the storage temperature and the fluid at the outlet at the drinking/feeding temperature. In another embodiment, the Peltier device is a straw shaped element.

The Peltier element may be configured for specific wattage ranges to prevent the fluid from being heated above a specific temperature or temperature range, making it virtually impossible to overheat the fluid.

A power source may be provided in the form of rechargeable batteries (for example, lithium rechargeable batteries) or, alternatively, single use batteries. A battery meter and alert (audible, visual or both) may be provided to indicate when the battery is getting to low.

The heating device may be activated by an on/off switch on the device or, alternatively, the device may be fitted with a fluid sensor that activates the heating device, in use, when it senses the presence of a flow of fluid between the inlet and the outlet.

The heating device may be activated by flow of the fluid through the Peltier element or heater core. This can be achieved, for example, by a sensor on a one-way valve.

At least one thermistor may be provided to measure the temperature of the fluid in at least one of the inlets, between the inlet and outlet, or at the outlet. These thermistors allow control of the heating device to ensure the correct temperatures are maintained. The thermistor may be embedded in the heating device and measure the heating device temperature. Preferably the temperature will be limited to a desired or optimum exit temperature. The curved path length may be chosen to ensure the fluid reaches said optimum temperature.

A thermostat or the like may be included to ensure the temperature of the feed does not exceed a predetermined temperature.

The container may be provided with a bimetallic strip. The bimetallic strip acts as a failsafe device which will disconnect the power source from the heating device in the event of the device overheating.

The container may include a tilt switch. A tilt switch may be provided to switch the heating device off after a set time of being vertical. A tilt switch may also be used to switch the heating device on (from a stand-by condition) when the container is picked up.

The container may include a sensor to alert the user when the fluid in the fluid storage container is getting too warm. This could be either an audible alert or a blinking LED light.

The passageway may include a vent. A vent may be provided to prevent a vacuum being formed within the passageway and to ensure a steady flow of fluid through the passageway. There may also be provided a vent into the fluid storage compartment to allow air in.

The fluid storage compartment may be insulated or gel-lined to prevent heat loss. A bag may be provided inside of the fluid storage compartment to minimize excess air in container. This also keeps the fluid up against the Peltier element to keep it cool.

The non-return means for preventing fluid that has passed through the inlet from returning to the vessel may be a non-return valve or, alternatively, the fluid may be prevented from returning by a restriction, which only opens under the action of the user sucking.

The present invention allows an infant to be provided with a liquid feed or fluid on demand at a temperature acceptable for consumption without needing to first heat the whole body of the fluid in a microwave or pan of boiling water, resulting in less wastage of liquid feed or fluid and reduced stress for the infant.

The present invention allows a user to be provided with a liquid feed or fluid on demand at a temperature acceptable for consumption without needing to first heat the whole body of the fluid.

An embodiment is directed to a drinking/feeding container for delivering fluid to a user at a drinking/feeding temperature which is higher than a storage temperature of the fluid. The container includes a fluid storage compartment, a lid and a heating device. The heating device is positioned between the fluid storage compartment and the lid. The heating device has an inlet which accepts the fluid from the fluid storage compartment, an outlet which dispenses the fluid to the lid and a passageway which extends between the inlet and the outlet. A Peltier device is provided between the inlet and the outlet and cooperates with the passageway to heat the fluid as the fluid moves from the inlet to the outlet. A power source supplies power to the heating device. A pulsing member pulses the power to the heating device whereby the pulsing of the power prevents the heating element from overheating. The heating device heats the fluid to the drinking/feeding temperature acceptable for drinking/feeding by the user.

An embodiment is directed to a method of heating fluid in a drinking/feeding container. The method includes: placing the fluid in a storage container of the drinking/feeding container; moving the fluid through a Peltier device to heat the fluid from a storage temperature of the fluid in the storage container to a drinking/feeding temperature of the fluid at an outlet of a passageway of the Peltier device; and preventing the fluid from the passageway of the Peltier device from reentering the storage container.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Certain exemplary embodiments will now be described to provide an overall understanding of the principles of the structure, function, manufacture and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting exemplary embodiments and that the scope of the various embodiments of the present invention is defined solely by the claims. The features illustrated or described in connection with one exemplary embodiment may be combined with the features of other embodiments. Such modifications and variations are intended to be included within the scope of the present invention.

Figure 1:
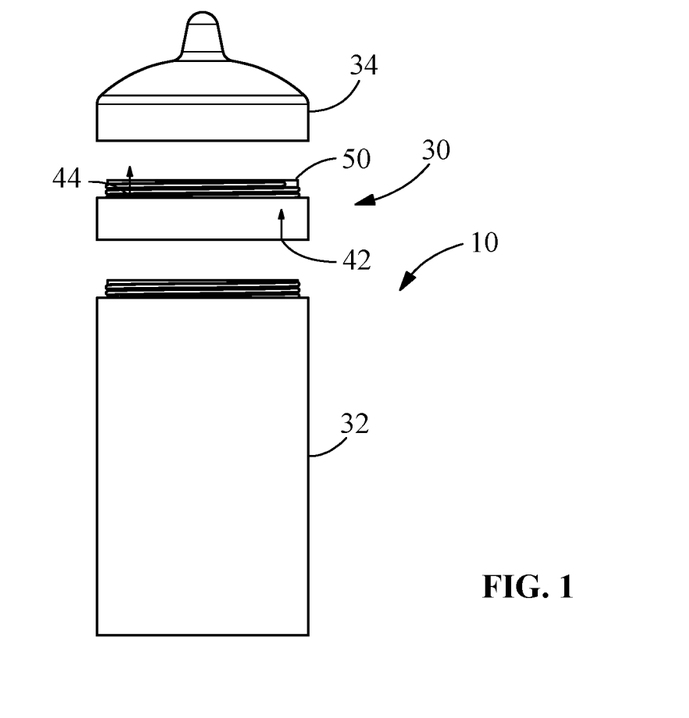
FIG. 1 is a diagrammatic view of a first illustrative drink container of the present invention; the drink container is a baby bottle with a heating device and a nipple removed therefrom.
Figure 2:
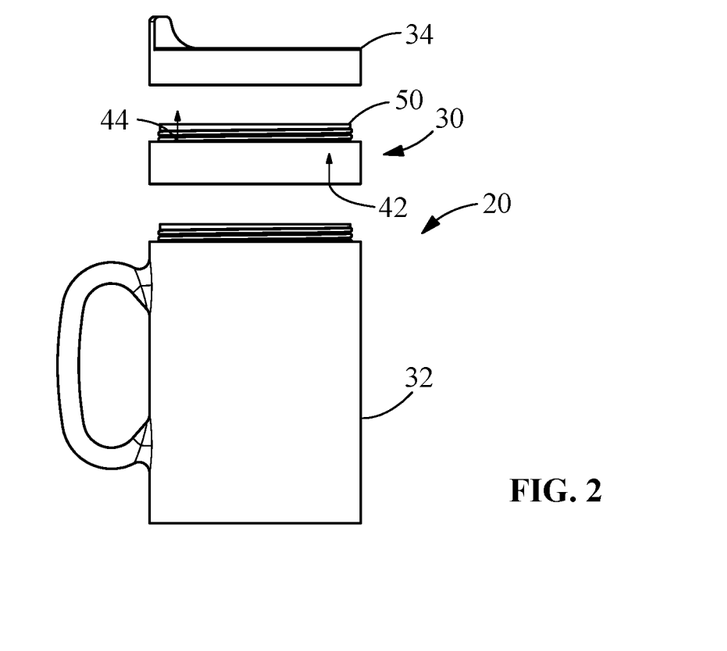
FIG. 2 is a diagrammatic view of a second illustrative drink container of the present invention; the drink container is a mug with a heating device and a lid removed therefrom.

As shown in FIGS. 1 and 2, drinking/feeding containers 10, 20 include a Peltier heating device 30 positioned between a fluid reservoir or storage container or compartment 32 and a lid or nipple 34. One illustrative drinking/feeding container is a baby bottle 10, as shown in FIG. 1. Another illustrative drinking/feeding container is a coffee or tea mug 20 as shown in FIG. 2. However, other types of drinking/feeding containers may be used without departing from the scope of the invention.

Figure 3:
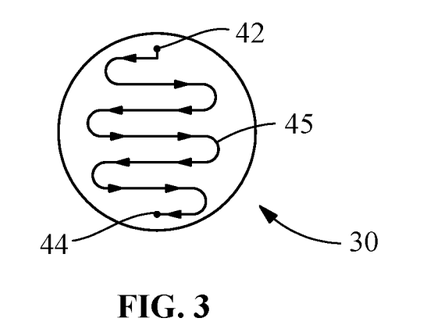
FIG. 3 is a detailed view of the circuitous fluid pathway in the heating device to help maximize heating of the fluid.
Figure 4:
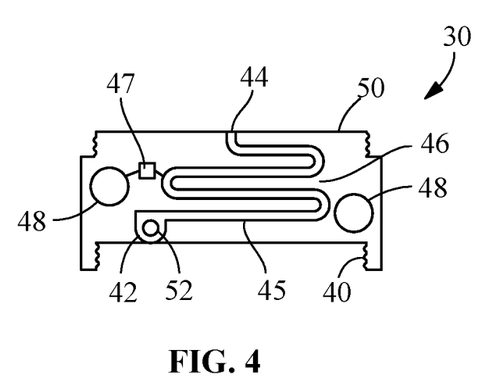
FIG. 4 is a cross sectional view of the heating device with electronic components.
Figure 5:
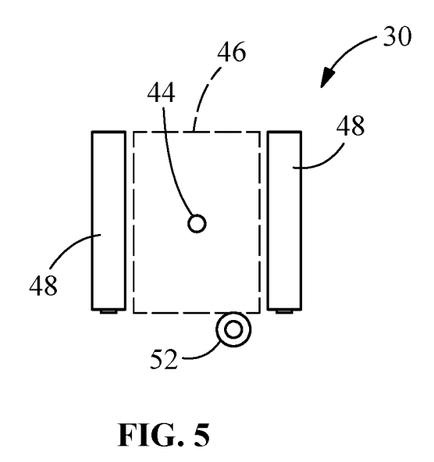
FIG. 5 is a top view of the heating device of FIG. 4.

Referring to FIG. 3, a cross-sectional view of an illustrative heating device 30 is shown. The heating device 30 is suitable for use with drinking/feeding containers for heating a flow of liquid or fluid (such as, but not limited to, milk, formula or beverage) from the storage container or compartment 32 to the lid or nipple 34. The heating device 30 includes a screw thread portion 40 for coupling the device 30 to the storage container or compartment 32, an inlet 42 for receiving a flow of fluid from the storage container or compartment 32 and an outlet 44 for allowing a flow of fluid to leave the heating device 30 and enter the lid or nipple 34. A passageway 45 extends between the inlet 42 and the outlet 44. As best shown in FIGS. 3 and 4, the passageway 45 may include curved portions. The heating device 30 has heating elements or a heating core 46 which cooperates with the passageway 45 to elevate the temperature of the flow of fluid passing between the inlet 42 and the outlet 44. A second threaded portion 50 is provided to allow the nipple or lid 34 to be coupled to the heating device 30. A one-way valve or non-return valve 52, provided proximate the inlet 42, prevents fluid that has passed through the inlet 42 from returning to the storage container 32. In the embodiment shown, the heating device 30 is powered by batteries 48 mounted within the heating device 30. However, other types of devices can be used to supply power to the heating device 30.

Specifically, with reference to FIG. 1, the feeding container 10 for a baby or infant is shown. The container 10 provides an infant with a fluid or liquid feed at an acceptable consumption temperature. The feeding container 10 includes a storage container or compartment 32 which contains the milk or formula at an appropriate storage temperature, a heating device 30 for elevating the temperature of the milk or formula from the storage temperature to an acceptable consumption temperature and a nipple 34.

Specifically, with reference to FIG. 2, the drinking container 20 is shown. The container 20 provides a user with a fluid or liquid feed at an acceptable consumption temperature. The drinking container 20 includes a storage container or compartment 32 which contains the beverage at an appropriate storage temperature, a heating device 30 for elevating the temperature of the beverage from the storage temperature to an acceptable consumption temperature and a lid 34.

Figure 6:
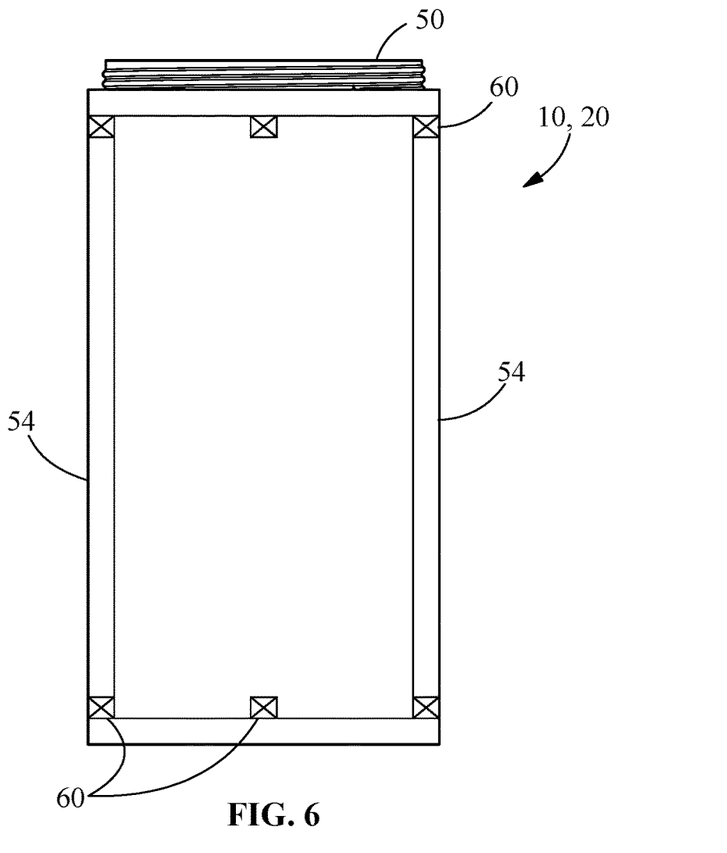
FIG. 6 is a diagrammatic view of a storage container of the drink container of the present invention.
Figure 7:
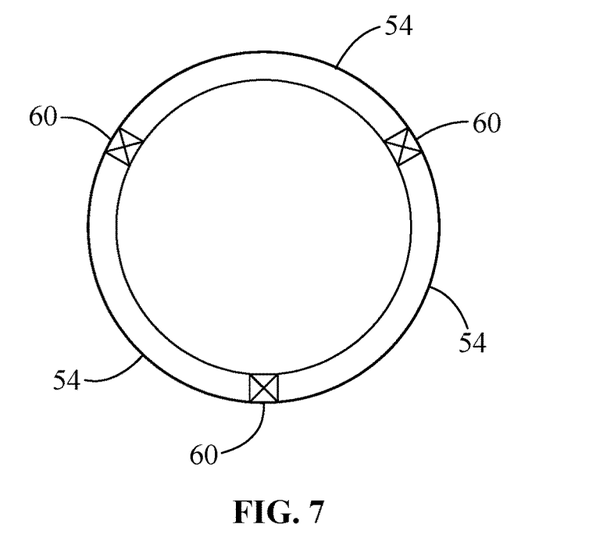
FIG. 7 is a diagrammatic top view of the illustrative storage container of FIG. 6.

As shown in FIG. 6, the storage container or compartment 32 may have insulated walls 54 to maintain the fluid at an appropriate storage temperature. For example, the container 10 may have a gel-lined cylindrical storage container or compartment to maintain the fluid at an appropriate storage temperature (for example, a chilled or cold temperature). Alternatively, for example, the exterior of the storage container may be insulated plastic or stainless.

The storage container or compartment 32 may include a sensor 60 to alert the user when the storage temperature of the fluid in the storage container or compartment 32 is not within acceptable limits or ranges. The sensor may incorporate an audible alert, a visual alert (such as, but not limited to, a blinking LED light) or both.

The storage container 32 or compartment may include a bag to minimize excess air in the system. The bag also facilitates the fluid being urged against the Peltier heating device 30, thereby helping to keep the fluid cool.

As previously described, the Peltier heating device 30 has a heating element or heating core 46 to elevate the temperature of a flow of fluid passing between the inlet 42 and the outlet 44. The Peltier heating device 30 may be powered by one or more batteries 48, such as, but not limited to, rechargeable lithium batteries. Alternatively, the Peltier heating device 30 may be powered by other means, such as, but not limited to, a power cord.

The Peltier heating device 30 may include a one-way valve 52 to prevent fluid that has passed through the inlet 42 from returning to the storage container or compartment 32. In one illustrative embodiment, when the container 10, 20 is sufficiently tilted or inverted, the weight of fluid opens the one-way valve 52 and creates a flow of the fluid through the heating device 30 to the lid or nipple 34. When the container 10, 20 is reverted to a normal upright orientation, the one-way valve 52 will close, preventing any of the heated fluid in the heating device 30 from returning to the storage container or compartment 32. This allows the fluid in the storage container or compartment 32 to remain at a desired and appropriate temperature. This ensures the unheated fluid in the storage container or compartment 32 can be kept at a sufficiently low temperature to stifle bacteria growth and reduce wastage.

Alternatively, the one-way valve 52 may be activated by a sucking action of the user. While a one-way valve 52 is shown and described, other types of non-return devices, which prevent the return of the heated fluid into the storage container or compartment 32, can be used without departing from the scope of the invention.

In the embodiment shown in FIGS. 1 through 5, the heating device 30 is a disk-shaped Peltier device with the outlet opening 44 in the middle to keep the fluid in the storage container at or below the storage temperature and the fluid at the outlet at the drinking/feeding temperature. A Peltier device is a device that heats on one side and cools on the other side as DC current passes through it. The Peltier heating device 30 may be cleaned and is reusable. Other configurations of the Peltier heating device may be used without departing from the scope of the invention. For example, the Peltier heating device may be, circular or square. In addition, the Peltier element may be solid with no center opening.

Alternatively, other known heating elements may be used, such as, but not limited to, a wire type heater wrapped around the curved passageway 45. The curved passageway 45 may be made from conductive material, such as, but not limited to, a highly conductive polymer, a metal coated highly conductive polymer or a ceramic. The curved passageway 45 allows the heat generated by the heating element to be transferred to the fluid which flows through the passageway 45. The passageway 45 may be removable for cleaning and is reusable.

The curved passageway 45 maximizes the heated surface area with which the fluid makes contact thereby improving the heating efficiency of the device. The curved passageway 45 may also control the flow of fluid through the device, and different configurations of curved passageway 45 will allow for different flow rates of the fluid for a given applied suction or force. Conveniently, the curved passageway 45 acts as a static mixer. This will help to ensure the fluid does not contain hot spots or cold spots, i.e. the feed is at a constant temperature.

A sensor may be provided which senses flow of the fluid through the heating device 30. Upon sensing the flow of fluid, the heating device 30 is activated. The sensor may be provided on the one-way valve 52 or at other locations.

A heat sensor may be provided to monitor the temperature of the flow of fluid proximate the outlet 44. The heat sensor may be programmed to shut down the heating device 30 in the event the temperature of the fluid raises beyond a safe temperature. Alternatively, the Peltier element may be configured for specific wattage ranges to prevent the fluid from being heated above a specific temperature or temperature range, making it virtually impossible to overheat the fluid to an unsafe temperature for consumption.

The heating device 30 may include an on/off switch to activate the heating device.

The drinking/feeding container 10, 20 may also include a pulsing member 47, such as, but not limited to, an integrated circuit feedback loop, for pulsing the power to the heating device whereby the pulsing of the power prevents the heating element from overheating.

The drinking/feeding container 10, 20 may also include a controller or circuit board which gathers the operating information of the drinking/feeding container 10, 20. The controller or circuit board analyzes the information and prevents the operation of the drinking/feeding container 10, 20 when the gathered information is outside of the normal operating parameters of the drinking/feeding container 10, 20. For example, the valve 52 may be forced closed when the fluid temperature is too high, or the heating device 30 may be disengaged.

Alternate illustrative embodiments may include a tilt switch, which switches the heating device off after a set time of the heating device and drinking/feeding container 10 being vertical.

Figure 8:
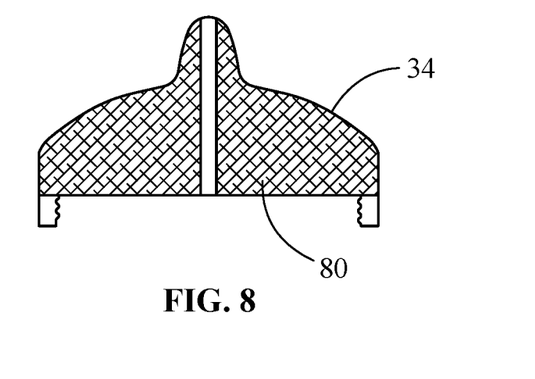
FIG. 8 is a cross sectional view of the gel filled nipple of FIG. 1.

In the alternate embodiment shown in FIG. 8, the nipple 34 may include a heat conducting gel 80 to maintain the drinking/feeding temperature of the fluid as the fluid leaves the outlet and to minimize fluid storage and maximize heat retention. In this embodiment, the nipple 34 of the baby container 10 itself will be a comfortable warm temperature for the baby, just like mother's breast.

Figure 9:
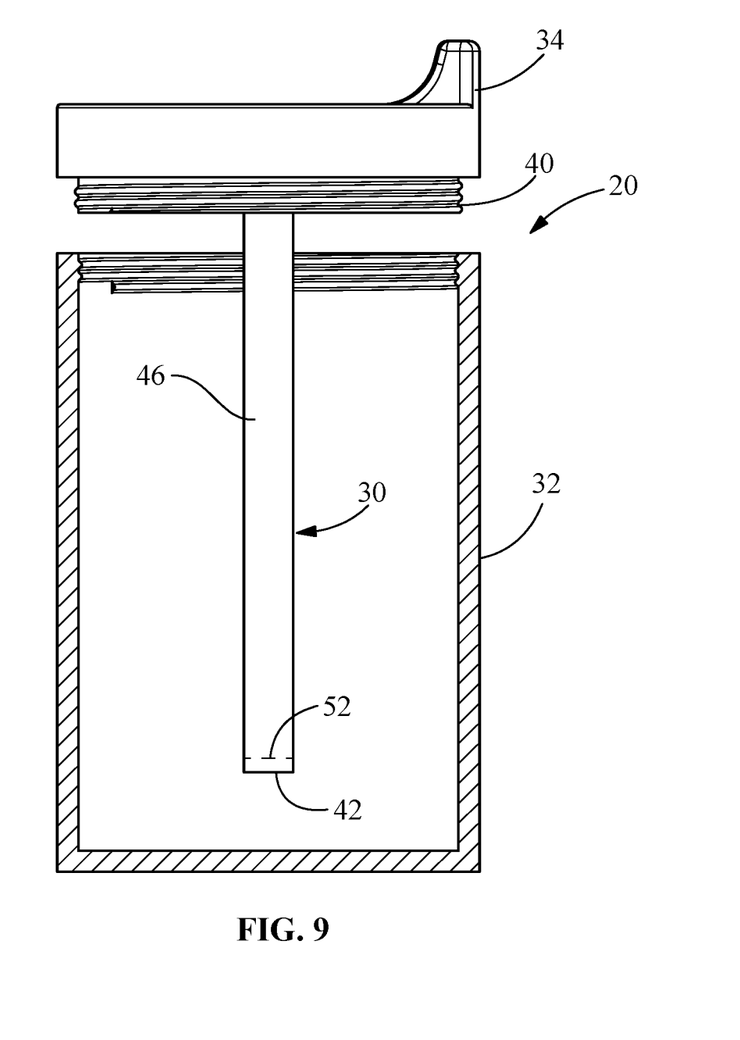
FIG. 9 is a diagrammatic view of the drink container of FIG. 2 with a straw type Peltier element provided therein.

An alternate embodiment of a drinking container 20 is shown in FIG. 9. In this illustrative embodiment, the Peltier heating device 30 is in the shape of a fat drinking straw like a fat milkshake straw. The length of the Peltier device will be determined by the overall size of the finished drinking container. This "straw" will reach down to the bottom of the drinking container and allow for easy cleaning. The Peltier device "straw" may have a one-way valve 52 at the bottom to allow fluid in but not back out, as previously described.

The use of the Peltier heating device 30 or "straw" allows the drinking container to be used in a similar manner as a sports water bottle. The drinking container is maintained in an upright position, allowing the user to suck the fluid out of the drinking container. In this embodiment, the drinking container does not need to be inverted, allowing the drinking container to have many advantages, including allowing for greater safety when driving, as the drinking container will not obstruct the view of the driver when drinking.

In the embodiment shown in FIG. 9, the first time the user draws fluid up into the straw, they would stop as soon as the fluid reaches their mouth. This is referred to as the initial priming. The one-way valve 52 prevents the fluid in the straw from back-flowing down into the drinking container. Once the initial priming is complete, the user pauses a few moments and then proceeds to take their first sip of beverage. This allows the Peltier element "straw" to heat the fluid inside the straw to an appropriate and desired temperature. Once primed, the Peltier element "straw" continuously heats the fluid inside of the fat straw, getting the fluid ready for the user's next sip. As the Peltier element "straw" does not heat the fluid outside the straw, and in fact provides cooling to the fluid outside the straw, the fluid outside of the straw, which may consist of a portion of milk and dairy products, is kept cool, preventing spoilage thereof.

In the embodiment shown, the Peltier element straw may be activated when the one-way valve is actuated. In addition, the Peltier element straw may be programmed to cycle off after a several minutes of nonuse to preserve the battery.

A button may be provided on the drinking container to allow the user to reactivate the Peltier element straw so the user does not get a cold first drink. This will preserve the battery. This also allows the beverage to remain in the storage container or compartment 32 for long periods of time and remain fresh and pleasant to the user while at the same time preserving the sensitive dairy ingredients from going sour.

An exemplary method of heating fluid in a drinking/feeding container includes placing the fluid in a storage container of the drinking/feeding container. The fluid is moved through the Peltier device to heat the fluid from the storage temperature of the fluid in the storage container to the drinking/feeding temperature of the fluid at the outlet of a passageway of the Peltier device. The fluid in the passageway is prevented from reentering the storage container.

Additional steps in the method may include: pulsing power supplied to the Peltier device to prevent the Peltier device from overheating; drawing the fluid into the passageway of the Peltier device to initially prime the Peltier device to begin heating the fluid in the passage; activating the Peltier device as the fluid passes an inlet of the passageway; deactivating the Peltier device after a fixed period of nonuse; and/or activating and deactivating the Peltier device by engaging an activation button.

Various modifications and improvements may be made to the exemplary embodiments hereinbefore described without departing from the scope of the invention.

For example, although the disclosed embodiments use batteries, alternative heat generation such as an exothermic chemical reaction could be used. Similarly, if a battery is used, it does not necessarily need to be stored in the heating device; the container could be in the form of a flask with the battery housed in the base section of the flask below the storage container. In this example, connecting the device to the vessel would complete the heating device with the battery.

Furthermore, although the one-way valve or non-return valve opens and closes under its own weight, it could also be in the form of a float or ball.

Furthermore, additional functionality could be added to the system such as a liquid crystal display to present information such as battery life, temperature of fluid or duration of feed.

If a rechargeable battery is preferred, it could be recharged by placing the device on a charger stand or connecting to a car cigarette lighter socket.

The curved path described in the specific description is only one example of a possible configuration of the curved path. As the curved path controls the flow of fluid through the device, an alternative configuration, with an increased or decreased number of turns over the same length, will give a different flow rate of fluid for a given applied suction or force. Other shaped inserts could be used other than a curved path to perform the same function. The curved path may be removable and reusable after cleaning. The curved path could be disposable and may be manufactured and sold separately.

The heating device has been described with reference to a Peltier element. Alternatively, the device could be heated by an exothermic chemical reaction or the heating element could be coated in a conductive spray and a wire-like arrangement etched out to create resistance and produce heat.

The device may be provided with a small pump formed and arranged to pump fluid through the heating device to the lid or nipple.

While the invention has been described with reference to a preferred embodiment, it will be understood by those skilled in the art that various changes may be made, and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A drinking/feeding container configured for delivering fluid at a drinking/feeding temperature which is higher than a storage temperature of the fluid, the container comprising:
    a fluid storage compartment;
    a lid;
    a thermoelectric device positioned between the fluid storage compartment and the lid, the thermoelectric device having an inlet in fluid communication with the fluid storage compartment, an outlet in fluid communication with the lid, and a passageway which extends between the inlet and the outlet substantially through a central axis of the thermoelectric device, wherein the thermoelectric device is configured to heat the fluid as the fluid moves from the inlet to the outlet, and is further configured to maintain the fluid in the fluid storage compartment at a temperature below 40 degrees Fahrenheit to stifle bacterial growth; and
    a power source for suppling power to the thermoelectric device;
    wherein the thermoelectric device is configured to heat the fluid to the drinking/feeding temperature.

2. The container as recited in claim 1, wherein the power source is one or more batteries mounted in the thermoelectric device.

3. The container as recited in claim 1, further comprising a one-way valve is provided proximate the inlet, the one-way valve configured to prevent the fluid that has passed the inlet from returning to the fluid storage compartment.

4. The container as recited in claim 1, wherein the storage container has insulated walls configured to maintain the fluid at the storage temperature.

5. The container as recited in claim 1, wherein the storage container is a gel-lined cylindrical container.

6. The container as recited in claim 1, further comprising one or more temperature sensors are provided proximate the storage container, the one or more temperature sensors are configured to provide a visual or audible alert.

7. The container as recited in claim 1, wherein the thermoelectric device is disk shaped with the outlet in the middle of the disk, the thermoelectric device is configured to keep the fluid in the storage container at or below the storage temperature and the fluid at the outlet at the drinking/feeding temperature.

8. The container as recited in claim 1, wherein a controller is provided which allows the thermoelectric device to operate at specific wattage ranges to prevent the fluid from being heated above a specific temperature or temperature range.

9. The container as recited in claim 1, further comprising a flow sensor in the passageway, wherein as the fluid flows through the passageway, the sensor activates the thermoelectric device.

10. The container as recited in claim 1, further comprising a temperature sensor proximate the outlet to sense the temperature of the fluid leaving the outlet, whereby if the temperature of the fluid leaving the outlet is greater than the drinking/feeding temperature, the thermoelectric device is turned off.

11. The container as recited in claim 1, wherein the lid is filled with heat conducting gel to maintain the drinking/feeding temperature of the fluid as the fluid leaves the outlet.

12. The container as recited in claim 1, wherein the drinking/feeding container is a mug.

13. The container as recited in claim 1, wherein the drinking/feeding container is an infant's feeding bottle.

14. The container as recited in claim 1, wherein a bag is provided in the storage container, the bag minimizes excess air in storage container and causes the fluid in the storage container to be maintained against the thermoelectric device.

15. The container as recited in claim 1, wherein the thermoelectric device is a straw shaped element, the thermoelectric device is configured to keep the fluid in the storage container at or below the storage temperature and the fluid at the outlet at the drinking/feeding temperature.

16. The container as recited in claim 1, further comprising a pulsing member for pulsing the power to the thermoelectric device, whereby the pulsing of the power prevents the thermoelectric device from overheating.

17. The container as recited in claim 1, wherein the thermoelectric device is a Peltier device.

* * * * *